July 6, 1954  H. E. DAY ET AL  2,683,206
WELDING ELECTRODE HOLDER
Filed Nov. 17, 1952
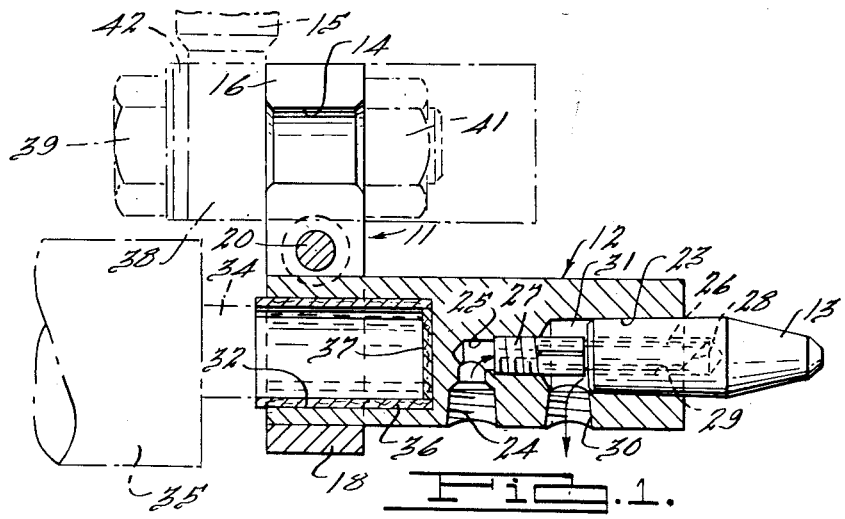
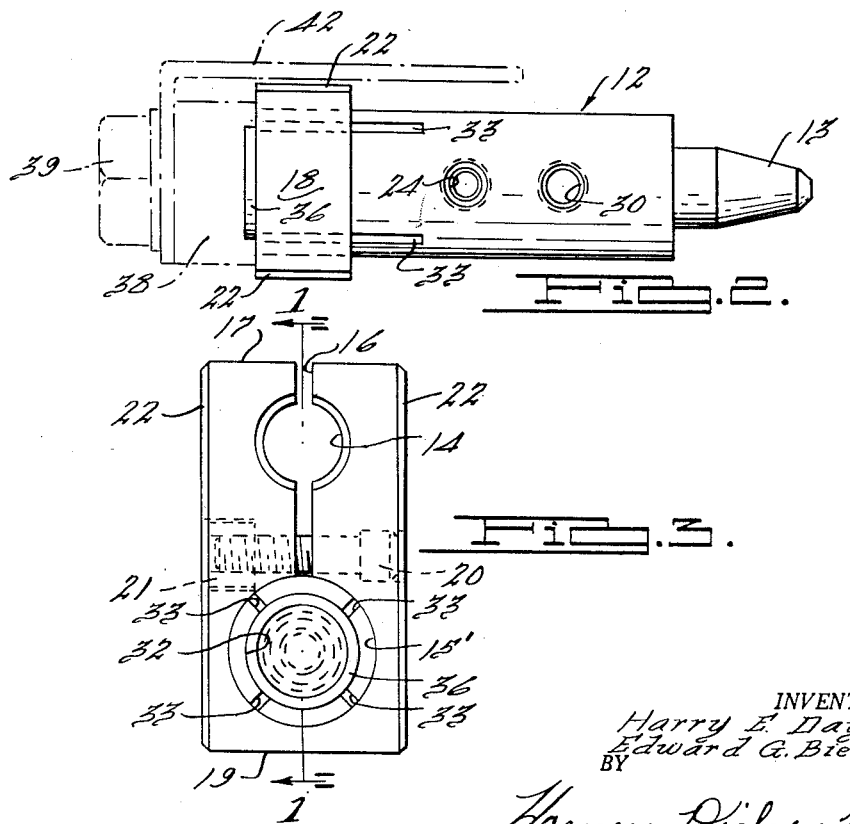
INVENTORS
Harry E. Day
Edward G. Biederman
BY
Barnes, Dickey & Pierce
ATTORNEYS Patented July 6, 1954

2,683,206

UNITED STATES PATENT OFFICE 2,683,206

WELDING ELECTRODE HOLDER

Harry E. Day, Huntington Woods, and Edward G. Biederman, Detroit, Mich., assignors to Link Welder Corporation, Detroit, Mich., a corporation of Michigan Application November 17, 1952, Serial No. 320,924

10 Claims. (Cl. 219—4)

This invention relates to welding electrode holders and more particularly to electrode holders adapted for use in either single or multiple spot welding machines using the so-called unit welding gun operation.

Various electrode holder constructions have been proposed for use with spot welding machines such as the multiple machines, in which a plurality of electrodes are fixed to a multiple frame and have individual welding guns for simultaneously engaging the work. These electrode holders are usually water-cooled, and in previous construction the welding tip adapter or horn has been made integral with a base or contact plate which is secured to the frame.

Such constructions have several important disadvantages, among which is the fact that the water outlets cannot be conveniently arranged during assembly, especially when the electrodes are closely spaced. This means that a shop must be stocked with several different types of electrode holders having water outlets facing in different directions, so that the proper arrangement can be made for the particular job. Another disadvantage of previous constructions has been the fact that when the tip adapters are worn, the entire unit including the adapter and base or contact plate must be scrapped, resulting in a waste of material. Moreover, when such integral units are manufactured the adapter and base are made of the same type of material, which means that the material used in the base is of a higher quality than is necessary, thus increasing the cost of manufacturing.

It is an object of the present invention to provide a novel and improved electrode holder which eliminates the disadvantages of previously known constructions, is relatively cheap to manufacture and has a high salvageability factor.

It is another object to provide an improved electrode holder which is easy to install in multiple spot welding machines, and which does away with the necessity of stocking several different types of electrode holders for the machine. In association with this object, the invention contemplates the provision of a water-cooled electrode holder which has universal adjustability, so that the water outlets of each holder can be located in any desired direction.

It is also an object to provide an improved electrode holder of the above nature, in which the base or contact plate is of simple construction, can be made of cheaper material, and need not be scrapped when the tip adapter must be replaced.

It is a further object to provide an improved electrode holder having the above characteristics, in which novel clamping means is provided for holding the tip adapter to the contact plate, this holding means providing a low resistance path for the current and also serving to secure the cable attaching means, and to attach the electrode holder to the welding gun.

Other objects, features, and advantages of the present invention will become apparent from the subsequent description, taken in conjunction with the accompanying drawings.

In the drawings:

Figure 1 is a side cross-sectional view of the improved electrode holder of this invention, taken along the line 1—1 of Figure 3, with the welding gun and cable being shown in dot-dash lines;

Figure 2 is a bottom plan view of the electrode holder showing the slotted formation of the tip adapter base and the location of the water outlets; and Figure 3 is an end view of the electrode holder showing the configuration of the contact plate and the location of the clamping screw.

The invention comprises in general a mounting or contact plate generally indicated at 11, and a tip adapter generally indicated at 12, which is secured to the contact plate and carries the welding electrode tip 13. The contact plate 11 is of generally rectangular block-like shape and may be fabricated of a relatively inexpensive material such as soft copper. As shown, the contact plate is provided with an apertured portion 14 for securing the cable 15 thereto in a manner later described, and is further provided with a larger apertured portion 15' for accommodating the tip adapter. These two apertured portions are in spaced relation in the direction of the longer dimension of the contact plate, and the plate is provided with a slotted portion 16 which extends inwardly from end 17 adjacent the cable area. In particular, slotted portion 16 extends along the center line of the contact plate and is contiguous with the tip adapter aperture 15', the two parts of the contact plate formed by the slot being connected at section 18 adjacent end 19. A clamping screw 20 extends through the contact plate, transversely to slot 16 and between apertures 14 and 15', the plate preferably having a counterbore for the screw head and a nut 21 of relatively hard material secured in a recess on one side of the plate. The opposite sides of the contact plate are preferably provided with insulative surfaces 22 for convenience in handling.

The tip adapter 12, which may be fabricated of an appropriate alloy, is of generally cylindrical shape and is provided with the conventional tapered recess 23 at one end and for receiving and gripping the electrode tip 13. The side of the electrode tip adapter is provided with a coolant inlet connection 24 which leads to an axial passage 25 within the adapter, and a coolant guide tube 26 of conventional construction extends from one end of passageway 25, being held by adapter 27. The inclined end 28 of the coolant tube extends within axial passageway 29 of the electrode tip, this passageway leading to the coolant outlet connection 30 through chamber 31 at the bottom of recess 23, connection 30 being alongside inlet connection 24 on the side of the tip adapter. It will be understood that the particular construction of the water conducting means within the tip adapter and the tip does not in itself form part of the present invention, and that other types of water conducting means could be used within the scope of the invention.

The base of the tip adapter 12 is provided with a recess 32 and a plurality of open-ended longitudinal slots 33 surrounding the recess, four such slots being shown in the present instance. The recess and slots are suitably of a length greater than the thickness of contact plate 11, and the diameter of the tip adapter is such that when the contact plate 11 is unstressed, the base of the tip adapter 12 will fit snugly in aperture 15' but can rotate freely therein. Recess 32 is adapted to receive the actuating member 34 of a welding gun or other support 35, shown in dot-dash lines, to which the electrode holder is attached. For this purpose, an insulative lining 36 is provided for the recess 32, and an end insulating member 37 is placed at the inner end of this recess, so that actuating member 34 will be electrically insulated from the electrode holder assembly but will fit snugly within recess 32.

The cable 15 has a terminal lug 38 shown in dot-dash lines and is preferably attached to the contact plate 11 by means of a bolt 39 extending through aperture 14 and secured by a nut 41, these parts also being shown in dot-dash lines. In the illustrated embodiment, a standard non-rotating clip 42 is shown in dot-dash lines for properly securing the cable lug.

In operation, the electrode holder will be assembled by securing cable 15 to the contact plate 11 in the manner described above, and then placing recess 32 of the tip adapter over the actuating member 34 of welding gun 35. The tip adapter 12 may then be freely rotated within its clamping aperture 15 until the coolant connections 23 and 30 are in the desired angular position with respect to the other parts of the assembly. It will be observed that the tip adapter is capable of universal rotation and the coolant connections can therefore be placed in any desired position without affecting the operation of the unit. Thus, with a group of electrode holders mounted in close relation, the coolant connections of each may be individually adjusted so as to clear the surrounding portions of the assembly.

After the proper adjustment is made, clamping screw 20 is tightened, thereby causing the two sides of the mounting plate to be drawn together. Cable bolt 39 will thus be tightly gripped by the contact plate, and the contraction of aperture 15' will cause the slotted base of the tip adapter to be compressed. The latter compression will take place about insulative member 36 which in turn surrounds actuating member 34 of the welding gun 35. The base of the tip adapter will therefore be firmly held in electrical conducting relationship with the contact plate 11, and at the same time the actuating member 34 will be firmly secured to the electrode holder unit. The nut 41 may then be tightened to secure cable lug 38 to the contact plate, and the coolant hoses (not shown) connected to coolant connections 24 and 30 of the tip adapter. The electrode holder, with the proper electrode tip 13 mounted in tapered recess 23, is now ready for operation.

It will be observed that the clamping screw 20 serves a multiple function, since it secures tip adapter 12 to the contact plate, fastens cable bolt 39 to the contact plate, and also serves to secure the entire electrode holder assembly to actuating member 34 of the welding gun thus making the entire assembly an integral unit. It will also be noted that the welding gun actuating member 34 is directly aligned with the tip adapter and welding tip axis so that the force transmitted by the gun will be directly transmitted to the work.

Since the contact plate 11 does not serve as a structural member and is not required to transmit forces, it need not be provided with shoulders or seats with which to transmit bearing pressures to the welding tip. Furthermore, there are no forces exerted on the compression joint between the contact plate and tip adaper which could disturb this connection. It should also be observed that since the contact plate does not serve to carry the cooling medium, the necessity for seals, joints or passageways in this member is avoided.

When the welding tip adapter becomes worn and is ready to be scrapped, it is merely necessary to unclamp the tip adapter and remove it from the contact plate. A new tip adapter may then be inserted in the contact plate aperture 15', and since it is not necessary to scrap the contact plate, the maintenance cost of the unit is substantially reduced.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. A welding electrode holder including a mounting plate, means for connecting a cable to said mounting plate, a welding tip adapter of generally elongated shape, said tip adapter having means at one end adapted to receive a welding electrode tip, means within said tip adapter for conducting a coolant to and from said tip, a fluid connection on the side of said tip adapter for carrying said coolant, a portion on said mounting plate for receiving said tip adapter, and means carried by said mounting plate and movable between a releasing position in which said tip adapter is supported for free rotation by said mounting plate, and a securing position in which said tip adapter is immovably held by the mounting plate, whereby said fluid connection is adjustably held in a desired angular position.

2. The combination according to claim 1, said securing means comprising an apertured portion of cylindrical shape in said mounting plate, and a member adapted to clamp said tip adapter in said apertured portion.

3. The combination according to claim 2, said tip adapter being further provided with an axially extending recess within the portion thereof secured to said mounting plate, said recess being adapted to receive a supporting member for the electrode holder, movement of said clamping member to its clamping position acting to secure said tip adapter to said support.

4. In a welding electrode holder, a contact plate, means on said contact plate for securing a cable thereto, an apertured portion on said contact plate, a welding tip adapter of generally cylindrical shape, said adapter having holding means at one end for a welding tip, a coolant connection on the side of said tip adapter, a mounting recess at one end of said tip adapter, said recess being adapted to receive supporting means for the electrode holder, a slotted portion on said tip adapter adjacent said recess, said slotted portion being disposed within said contact plate aperture, a slotted portion on said mounting plate contiguous with said aperture, and means for drawing together the parts of said contact plate on either side of said slotted portion, whereby said tip adapter is clamped to said contact plate and to said support.

5. A welding electrode holder including a contact plate, means for attaching a cable thereto, a tip adapter separable from said contact plate, said tip adapter being of generally elongated shape and having holding means at one end thereof for a welding tip, coolant conducting means within said tip adapter for carrying a coolant toward and away from said welding tip, a coolant connection on one side of said tip adapter for attaching a coolant supply line thereto, an axial recess at one end of said tip adapter adapted to receive a support for the electrode holder, a longitudinal slotted portion in said tip adapter adjacent said recess, an apertured portion in said contact plate, the section of said tip adapter containing said recess and slotted portion being disposed within said contact plate aperture and freely rotatable therein, and means for reducing the size of said aperture so as to clamp said tip adapter and said contact plate together and to simultaneously clamp said tip adapter to said support.

6. A welding electrode holder including a contact plate having substantial thickness, means for attaching a cable to said contact plate, a tip adapter separable from said contact plate, said tip adapter being of generally cylindrical shape and having holding means at one end thereof for an electrode tip, an axial recess in the other end adapted to receive a support for the electrode holder, an apertured portion in said contact plate having substantially the diameter of said tip adapter, the recessed portion of said tip adapter being disposed within said aperture, a slotted portion in said contact plate contiguous with said aperture, and means carried by said contact plate and movable between a releasing position in which said tip adapter is freely rotatable on said support and within said aperture, and a clamping position in which said tip adapter is held in electrical conducting engagement with said contact plate.

7. The combination according to claim 6, said cable attaching means comprising a second apertured portion in said contact plate and adapted to receive a terminal lug holding bolt therethrough, the slotted portion of said contact plate being contiguous with said second apertured portion, whereby movement of said clamping means to its clamping position forces the opposite sides of said contact plate into gripping relation with said bolt.

8. The combination according to claim 7, said clamping means including a screw disposed in said contact plate between said first and second apertures, said screw extending in a direction transverse to said slotted portion.

9. A welding electrode holder including a contact plate, a first apertured portion in said contact plate, a tip adapter of generally cylindrical shape having one end removably disposed within said apertured portion, means at the other end of said tip adapter for holding a welding electrode tip, coolant conducting means within said tip adapter for carrying coolant toward and away from said welding tip, a pair of fluid connections on the side of said tip adapter for connecting coolant lines thereto, an axial recess in the end of said tip adapter held by said contact plate, said recess being adapted to receive a support for the electrode holder, a plurality of longitudinally extending slots in said tip adapter adjacent said recess, a second apertured portion in said contact plate adapted to receive cable holding means therein, a slotted portion in said contact plate passing through said second apertured portion and contiguous with said first apertured portion, and a clamping screw disposed in said mounting plate between said apertured portions and extending transversely to said mounting plate slotted portion, said clamping screw being movable between a releasing position in which said tip adapter is freely rotatable and a clamping position in which said tip adapter is clamped between its mounting plate aperture and the supporting means, whereby said coolant connections can be adjustably secured in any desired angular position.

10. A welding electrode holder including a mounting plate, a welding tip adapter of generally elongated shape, said tip adapter having an axial recess at one end adapted to receive a welding electrode tip in axial alignment with the tip adapter, a second axial recess at the other end of said tip adapter to receive a support for the electrode holder, whereby axial forces will be transmitted directly to said tip, means within said tip adapter for conducting a coolant to and from said tip, a fluid connection on the side of said tip adapter for carrying said coolant, a portion on said mounting plate for receiving said tip adapter, and means carried by said mounting plate and movable between a releasing position in which said tip adapter is supported for free rotation by said mounting plate, and a securing position in which said tip adapter is immovably held by the mounting plate, whereby said fluid connection is adjustably held in a desired angular position.

References Cited in the file of this patent

UNITED STATES PATENTS

| Number | Name | Date |
| --- | --- | --- |
| 1,474,199 | McBerty | Nov. 13, 1923 |
| 2,089,013 | Beideman | Aug. 3, 1937 |
| 2,215,289 | Hensel et al. | Sept. 17, 1940 |
| 2,506,277 | Panik et al. | May 2, 1950 |